United States Patent [19]
Ricks et al.

[11] Patent Number: 5,947,509
[45] Date of Patent: Sep. 7, 1999

[54] AIRBAG INFLATOR WITH SNAP-ON MOUNTING ATTACHMENT

[75] Inventors: Merle K. Ricks, Layton; Janiel Sorenson, Salt Lake City, both of Utah; Jeffrey L. Scharret, Rochester Hills, Mich.; John A. Duran, Glendora, Calif.

[73] Assignees: Autoliv ASP, Inc., Ogden, Utah; Avibank Mfg. Co., Inc., Burbank, Calif.

[21] Appl. No.: 08/721,085

[22] Filed: Sep. 24, 1996

[51] Int. Cl.[6] .................................................... B60R 21/16
[52] U.S. Cl. .................... 280/728.2; 280/731; 24/662; 24/68.3; 411/508; 411/913
[58] Field of Search ............... 280/728.2, 730.2, 280/731, 732; 411/508, 509, 338, 339, 913; 24/616, 662, 671, 683

[56] References Cited

U.S. PATENT DOCUMENTS

| | | | |
|---|---|---|---|
| 2,495,037 | 1/1950 | Tinnerman | 411/913 |
| 2,605,806 | 8/1952 | Tinnerman | 411/913 |
| 4,847,959 | 7/1989 | Shimada et al. | 24/662 |
| 5,333,897 | 8/1994 | Landis et al. | 280/728 A |
| 5,350,190 | 9/1994 | Szigethy | 280/728 A |
| 5,556,125 | 9/1996 | Ricks et al. | 280/728.2 |
| 5,590,900 | 1/1997 | Duran et al. | 280/728.2 |
| 5,599,039 | 2/1997 | Goss et al. | 280/731 |
| 5,624,130 | 4/1997 | Ricks | 280/728.2 |
| 5,630,611 | 5/1997 | Goss et al. | 280/728.2 |

*Primary Examiner*—Harold J. Tudor
*Attorney, Agent, or Firm*—Ohlandt, Greeley, Ruggiero & Perle, L.L.P.; George W. Rauchfuss, Jr.

[57] ABSTRACT

A snap-on mounting attachment is provided for securing an airbag inflator module having a base plate to the steering wheel of a motor vehicle. The mounting attachment includes two fastener studs extending rearwardly from the base plate, each fastener stud having a yieldable holding barb. Two capture brackets are mounted to the spokes of the steering wheel, and each capture bracket holds a snap receptor in floating encapturement therein, i.e., with a limited range of lateral and vertical movement. The snap receptors each have a metal ring embedded in a polymer shell and define a stud receiving opening therethrough with the metal ring defining a lip engaged by the holding barb of the fastener stud. Bias stops between the base plate and the steering wheel take up slack in the mounting attachment and eliminate rattles, and the polymer shell of the snap receptors also minimizes rattles. The steering wheel and airbag inflator module have complementary covers, and the floating encapturement permits alignment of the covers.

18 Claims, 6 Drawing Sheets

AIRBAG INFLATOR WITH SNAP-ON MOUNTING ATTACHMENT

FIELD OF INVENTION

The present invention relates to the mounting of an airbag inflator module to a steering wheel or other support in a motor vehicle utilizing a snap-on mounting attachment which requires no tools, minimizes the potential for rattles, and accommodates tolerances in the assembly.

BACKGROUND OF INVENTION

It has long been desirable to mount an airbag inflator module to a vehicle support, such as a vehicle steering wheel, without requiring the use of tools. Snap type attachments have been used for this purpose, for example in U.S. Pat. No. 5,333,897 entitled SNAP LOCK PIN INFLATABLE RESTRAINT MODULE MOUNTING MECHANISM. That mounting mechanism generally comprises a pair of barbed mounting studs extending from the rear of an airbag inflator module, and a plate secured to the steering wheel of a vehicle wherein the plate has spaced-apart apertures for receiving the mounting studs. Other mounting systems have similarly used a pair of studs extending rearwardly from an airbag inflator module such that the inflator module may be pressed into apertured mounting plates on the vehicle for quick and easy mounting of an airbag inflator. However, in these prior art mounting mechanisms, the alignment between the mounting studs and the apertures of the mounting plate is inflexible other than that achieved by providing a tapered end on the studs, and this also adds some degree of difficulty to the mounting, in that it is not usually possible to view the mounting plate as the studs are placed therein. Further, careful attention to tolerances is required to achieve good alignment of the assembled parts, and also to prevent rattling, and even then some rattling may occur under certain operative circumstances. The alignment of the airbag inflator module cover and the steering wheel cover present a special problem, in that these parts are molded from soft thermoplastic wherein precise shapes are difficult to maintain.

Accordingly, there is a need for an improved mounting system for use in securing an airbag inflator module to a vehicle support, which operates easily and which accommodates tolerances and prevents rattles.

SUMMARY OF INVENTION

An object of the present invention is to provide a new and improved mounting attachment for securing an airbag inflator module to a vehicle support, such as a steering wheel, without the use of tools.

Another object of the present invention is to provide a new and improved mounting attachment for securing an airbag inflator module to a vehicle support which accommodates dimensional tolerances in an airbag inflator module and vehicle support.

An additional object of the invention herein is to provide a new and improved mounting attachment for securing an airbag inflator module to a vehicle support which operates easily and quickly, even when the attachment area is not readily viewable by the installer.

It is a further object of the invention herein to provide a new and improved mounting attachment for securing an airbag inflator module to a vehicle support which minimizes rattling between and among the assembled part.

It is a yet another object of the invention herein to provide a mounting attachment for securing an airbag inflator module to a vehicle support which is strong and able to withstand the forces generated during operation of the vehicle and operation of the airbag inflator module in deploying an airbag.

The foregoing objects and advantages of the present invention are accomplished in a new and improved snap-on mounting attachment for securing an airbag inflator module having a base plate to a support provided on a motor vehicle, the mounting attachment including a fastener stud with at least one yieldable holding barb angled outwardly therefrom, the fastener stud secured to and extending from one of an airbag inflator module base plate and vehicle support, and a snap receptor mounted in floating encapturement on the other of the airbag inflator base plate and vehicle support. The snap receptor has an opening extending therethrough for receiving the fastener stud and defines a lip engaged by the holding barb. The snap receptor is held in floating encapturement permitting a limited range of movement of the snap receptor while maintaining it securely mounted, facilitating aligning the opening of the snap receptor with the fastener stud. This further permits the assembled snap receptor and fastener stud to shift in order to fit the airbag inflator module at the desired position in the vehicle support.

According to one aspect of the invention, resilient bias stops are provided to bias the assembled parts into constant, rattle free engagement. A particular bias stop is elastomeric and bears against the base plate of the airbag inflation module.

According to additional aspects of the invention, the snap receptor is mounted to one of the airbag inflator module or vehicle support by a capture bracket having upper and lower retainer plates holding the snap receptor in floating encapturement. The retainer plates have openings larger than the stud-receiving opening of the snap receptor, wherein the opening of the snap receptor is exposed to the fastener stud throughout the motion permitted by the floating encapturement. Additionally, the capture bracket also provides a vertical component of movement between the upper and lower retainer plates, facilitating the limited movement characterizing the floating encapturement of the snap receptor.

According to further aspects of the invention, at least one of the upper and lower retainer plates of the capture bracket have registered attachment holes for mounting the capture bracket to the vehicle support or airbag inflator module. Particular upper and lower retainer plates both have attachment holes for both securing the upper and lower plates together and mounting them.

According to further aspects of the invention, the snap receptor has a collar surrounding the stud receiving opening, and the collar extends through the opening in the upper retainer plate to position the snap receptor within the capture bracket. Additionally, the stud-receiving opening of the snap receptor is counter sunk for readily receiving and centering the fastening stud.

According to other aspects of the invention herein, the snap receptor comprises a metal ring embedded in a polymer shell, the ring being exposed in the receptor opening and defining the lip engaged by the holding barb of the fastening stud. Additionally, the shell is generally annular, and the shell is fabricated of nylon.

The invention, together with further objects, features, advantages and aspects thereof, will be more clearly understood from the following description of the preferred embodiments taken in connection with the accompanying drawings.

DRAWINGS

The same reference numerals refer to the same elements throughout the various figures.

DESCRIPTION OF PREFERRED EMBODIMENTS

Figure 4:
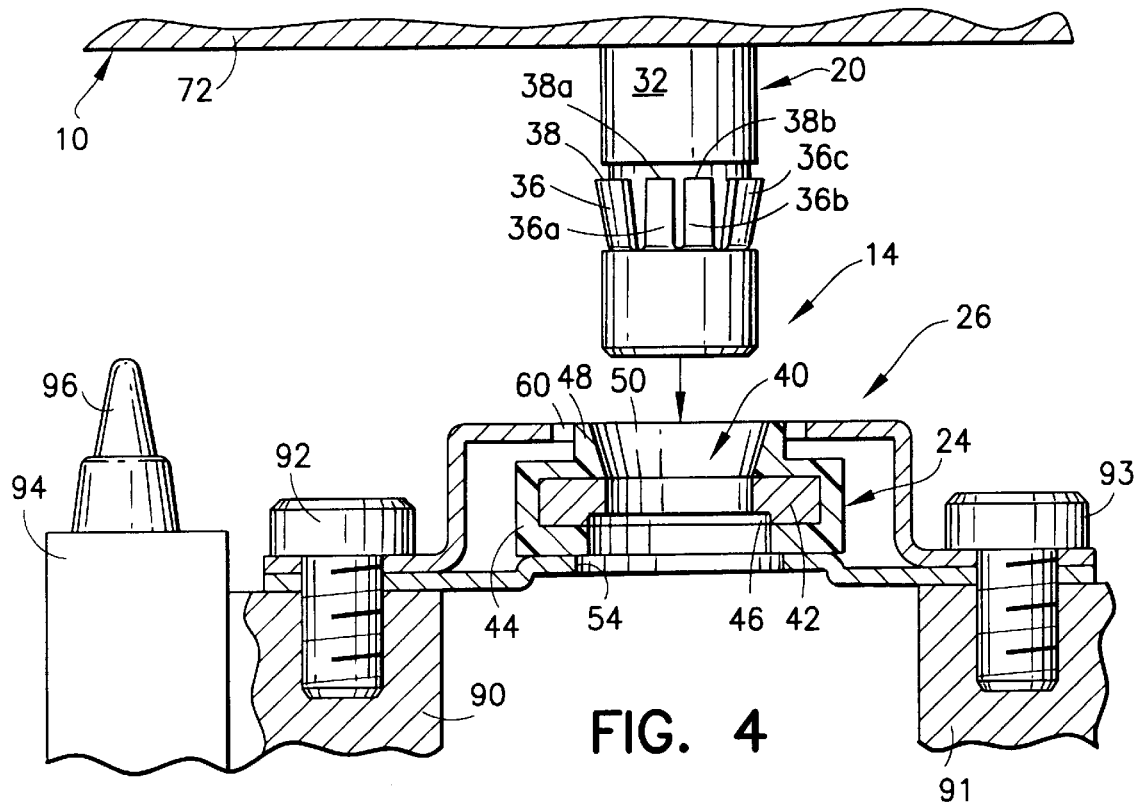
FIG. 4 is an enlarged side elevation view, partially cut away and partially in section generally along lines 4—4 of FIG. 3, of the snap-on mounting attachment of FIG. 3, prior to the airbag inflator module and vehicle steering wheel being secured together.
Figure 5:
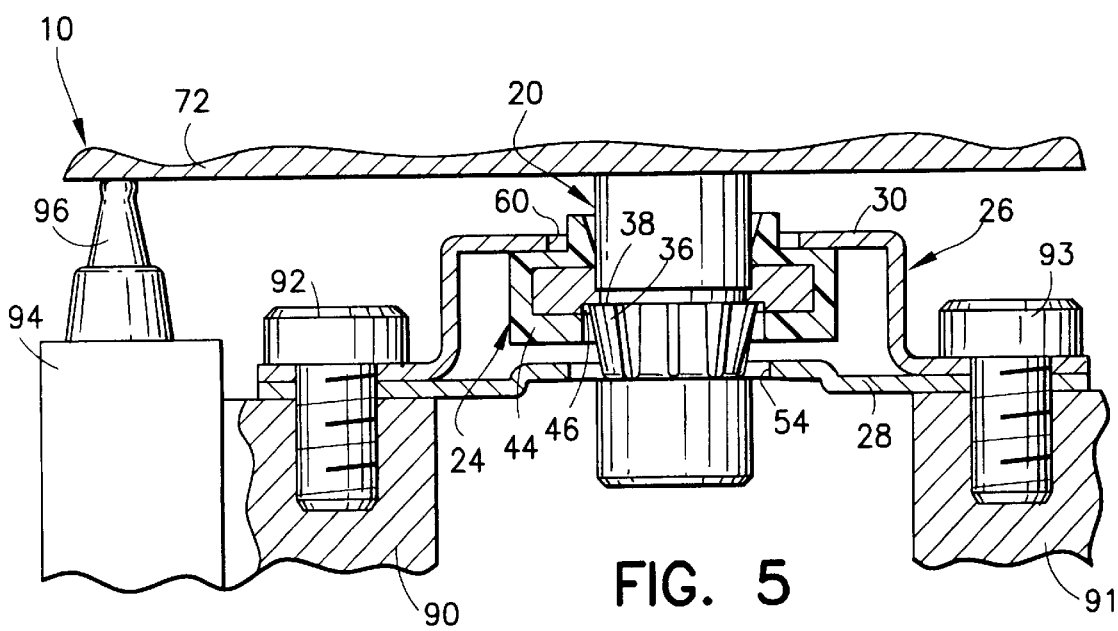
FIG. 5 is a side elevation view, partially cut away and partially in section generally along the lines 4—4 of FIG. 3, of the snap-on mounting attachment according to the invention herein, shown securing the airbag inflator module to the vehicle steering wheel together.
Figure 6:
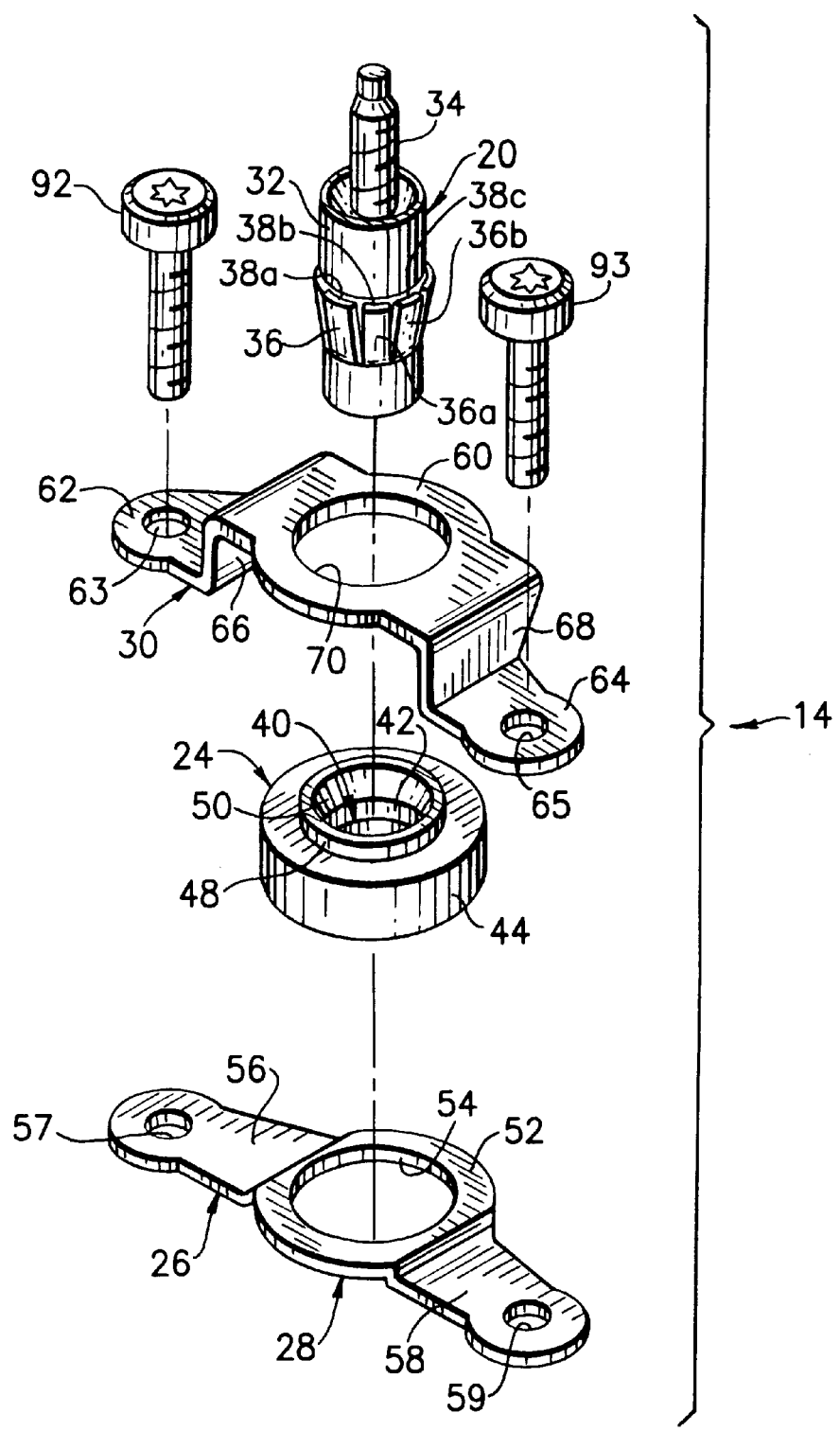
FIG. 6 is an exploded perspective view of the snap-on mounting attachment of FIG. 3.

FIGS. 1–6 generally illustrate an airbag inflator module 10 and securing it to a vehicle support in the form of a steering wheel 12 by snap-on mounting attachments 14 and 16, according to the invention herein. The principal elements of snap-on mounting attachment 14 are shown in FIG. 6, attachment 16 being identical, and FIGS. 1–5 show the relationship and operation of the snap-on mounting attachments in securing the airbag inflator module 10 to the steering wheel 12.

With reference to FIG. 6, the snap-on mounting attachment 14 generally comprises a fastener stud 20, a snap receptor 24 and a capture bracket 26 having a lower retainer plate 28 and an upper retainer plate 30.

The fastener stud 20 has a generally cylindrical sleeve 32 having a threaded mounting post 34 extending therefrom. The fastener stud 20 has a plurality of yieldable outwardly biased holding barbs including barbs 36, 36a, 36b, each of the holding barbs having a distal tip 38, 38a, 38b, 38c, respectively, spaced incrementally outwardly from the sleeve 20. The holding barbs extend angularly outwardly and are bendable inwardly to fit within the profile of the sleeve 32 as the sleeve passes into the snap receptor 24, and the barbs spring outwardly to present the tips for holding purposes, as more fully discussed below. The fastener stud 20 and its holding barbs are preferably fabricated of steel.

The snap receptor 24 is generally annular and defines a stud-receiving opening 40 for receiving the sleeve and holding barbs of the fastening stud 20. With reference to FIG. 4, the snap receptor 24 has a ring 42 embedded in a shell 44, wherein the ring and shell together define the opening 40. The ring 42 has a lip 46 at its lower, inside edge which receives the tips 38, 38a, 38b . . . of the fastener stud holding barbs 36, 36a, 36b . . . , as best seen in FIG. 5. The ring 42 is fabricated of steel, but can be made of other metals or suitably strong material to provide the engagement interface of the snap-on mounting attachment. The shell 44 includes an upstanding collar 48, and the shell including the collar 48 is counterbored at 50 to provide a flared entry portion of the opening 40 in the snap receptor 24. The shell is fabricated of nylon or other strong polymer, nylon being particularly suitable because of its strength and its tendency to reduce rattle noises upon contact with metal parts.

Figure 2:
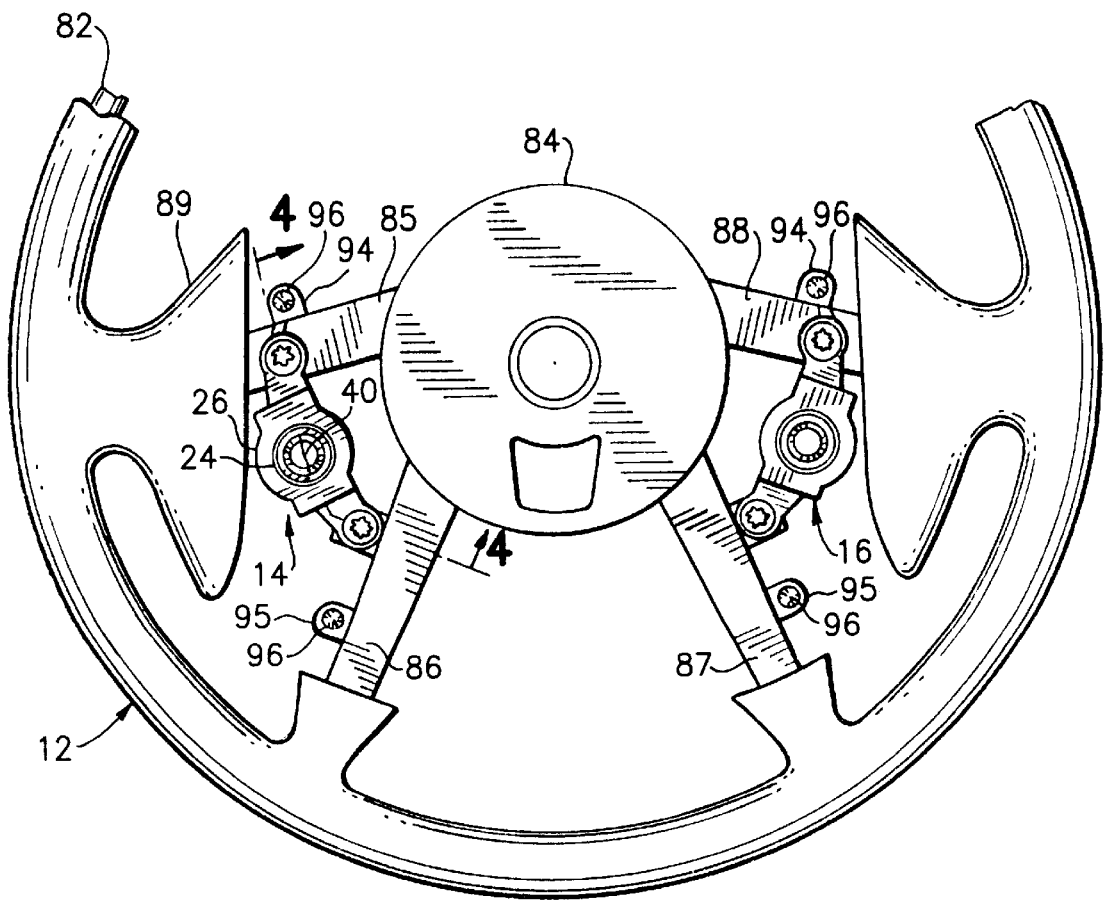
FIG. 2 is a front elevation view of a vehicle steering wheel including two capture brackets and snap receptors forming a part of the snap-on mounting attachment of the invention herein.

The capture bracket 26 has a lower plate 28 and an upper plate 30. The lower plate 28 has a base 52 defining an opening 54, and has mounting ears 56 and 58 defining attachment holes 57 and 59, respectively. The upper plate 30 has a top panel 60 elevated from flanking mounting ears 62 and 64 by legs 66 and 68. The mounting ears define attachment holes 63 and 65, respectively, which align with the attachment holes 57 and 59 of the mounting ears of the lower plate, and the top panel 60 defines an opening 70 which aligns with the opening 54 in the lower plate 28. Screw fasteners 92 and 93 are used to secure the upper and lower plates of the capture bracket together and mount the capture bracket 26 to the steering wheel 12, as illustrated in FIGS. 2, 4 and 5. The collar 48 extends into the opening 70, but is of smaller diameter than the opening 70, so that the snap receptor 24 has a limited amount of lateral movement within the capture bracket 26. Also, the top panel 60 and base 52 are spaced apart by a greater dimension than the thickness of the outer portion of the shell, such that the snap receptor also has a limited degree of vertical movement within the capture bracket. Thus, the snap receptor 24 is in floating encapturement within the capture bracket 26, and may move through a range of lateral and vertical motion to facilitate insertion of the fastening stud 20, and to accommodate tolerances in the manufacture of the attached parts, such as the airbag inflator module and steering wheel.

Figure 1:
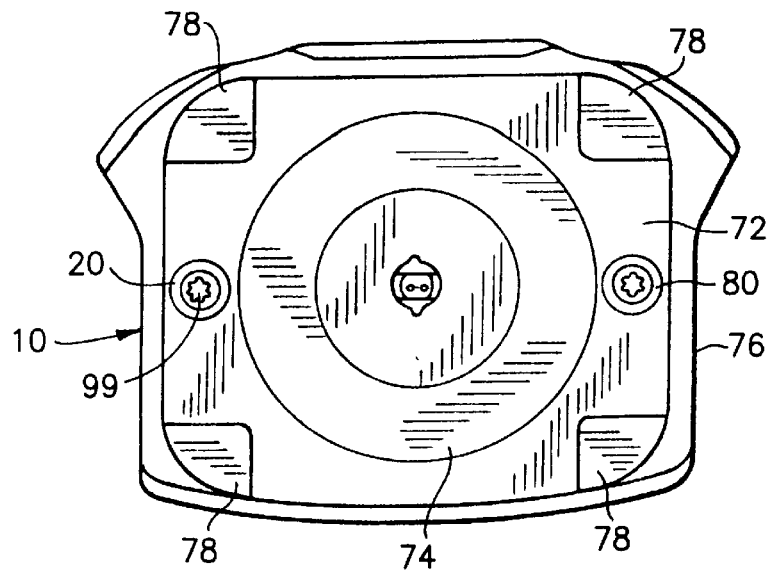
FIG. 1 is a rear elevation view of an airbag inflator module having two fastener studs forming a part of a snap-on mounting attachment according to the invention herein.
Figure 3:
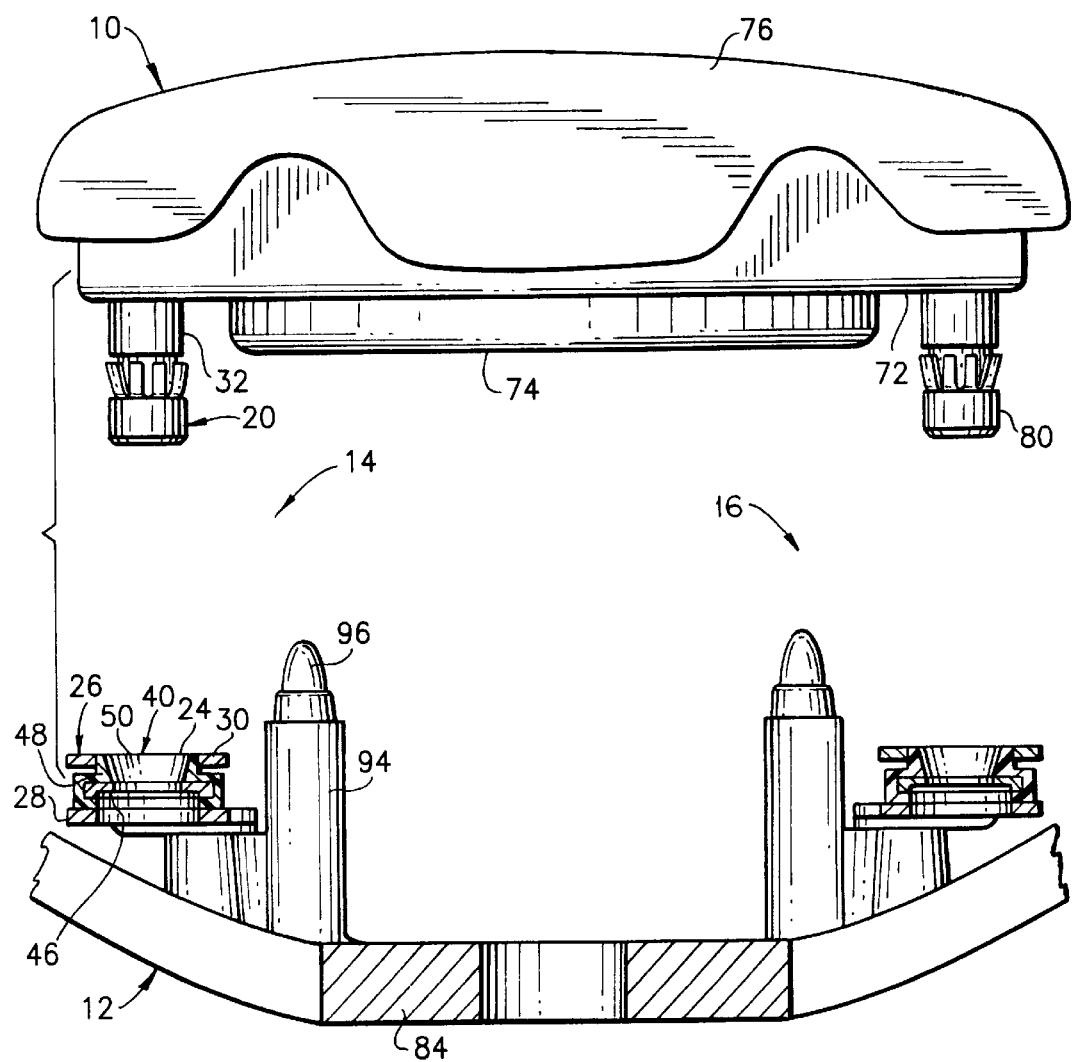
FIG. 3 is a side elevation view of the airbag inflation module and fastener studs of FIG. 1 and a partial side elevation view of the vehicle steering wheel with capture brackets and snap receptors of FIG. 2, forming the snap-on mounting attachment according to the invention herein.

With reference to FIGS. 1–3, the airbag inflator module 10 has a base plate 72 mounting an inflator 74. A cover 76 encloses an airbag, not illustrated, which is deployed upon operation of the inflator module 10. With particular reference to FIG. 1, the rear of the airbag inflator module 10 has four corner lands 78 which are formed as a part of the base plate or underlying inflation module structure. Airbag inflator modules are well-known in the art and the internal structure and operation are not relevant to the present invention.

The fastener stud 20 of the snap-on mounting attachment 14 and fastener stud 80 of the snap-on mounting attachment 16 are secured to the base plate 72 of the airbag inflator module 10 by means of the threaded mounting post 34 and extend rearwardly therefrom. It should be noted that the snap-on mounting attachments 14 and 16 are the same in all respects, and the two attachments 14 and 16 are provided for properly mounting the airbag inflation module.

The steering wheel 12 has a rim 82, a hub 84, and four spokes 85–88 connecting the rim and hub. The rim and portions of the spokes are provided with a cover 89 which is shaped in the vicinity of the spokes to receive the cover 76 of the airbag inflator module 10. The shapes are complementary to provide a complete cover of the steering wheel and airbag inflator module.

As best seen in FIGS. 4 and 5, the spokes 85 and 86 define mounting pads 90 and 91, respectively, which receive the aligned mounting ears 56, 58, 62, 64 of the capture bracket 26, the ears 56, 58, 62, 64 being secured to the mounting pads by fasteners 92 and 93. The stud keeper of the snap-on mounting attachment 16 is similarly mounted to spokes 87 and 88. The spokes 85 and 86 also define posts 94 and 95, post 94 being seen in FIGS. 4 and 5, the posts having resilient bias stops 96 positioned on the ends thereof. Spokes 87 and 88 also form posts 94, 95 with bias stops 96 on the respective ends thereof.

The airbag inflation module 10 is mounted to the steering wheel 12 by orienting it above the steering wheel, as shown in FIGS. 3 and 4, with the mounting studs 20 and 80 generally aligned with the openings in the snap receptors. As the airbag inflation module is pressed into the steering wheel, the fastener studs are inserted into the snap receptors. The holding barbs 36, 36a, 36b . . . yield to pass through the ring 42 of the snap receptor, and the holding barbs snap open so that their tips 38, 38a, 38b . . . engage the lip 46 and secure the fastener stud 20 from being withdrawn. When the airbag inflator module is so mounted, its cover 76 aligns with the cover 89 of the steering wheel to present a smooth and attractive assembly.

The floating encapturement of the snap receptor 24 within the capture bracket 26 facilitates aligning the fastener stud and snap receptor for insertion of the fastening stud, and also permits some lateral movement in lining up the airbag inflation module cover and the steering wheel cover. This accommodates dimensional tolerances in these parts, which often occur when thermoplastic parts, such as the covers, are cooled. With reference to FIG. 5 where the assembly process has been completed, the bias stops 96 are compressed and bias the snap receptor against the upper plate 30 of the capture bracket 26. This bias action, together with the selection of materials maintains the assembly in rattle free condition.

The engagement between the mounting stud and snap receptor is strong, being provided by steel barbs at a low angular orientation, and the structure of the snap receptor itself and the capture bracket holding it are also strong, whereby the snap-on mounting attachment is well adapted to bear the shocks and loads associated with mounting the airbag inflator module and holding it during its operation. The mounting studs may alternatively extend from the steering wheel and the capture bracket be mounted on the airbag inflator module. However, the arrangement shown is preferable because the airbag inflator module may be released for service or replacement by unscrewing the fastener studs from the base plate. The end of mounting stud 20 is provided with a star-shaped depression 99 (FIG. 1), configured to receive a tool for that purpose. It will also be appreciated that one or more snap-on mounting attachments can be used to mount an airbag inflator module to vehicle supports other than a steering wheel, e.g., to a dashboard bracket for passenger side airbags.

Figure 7:
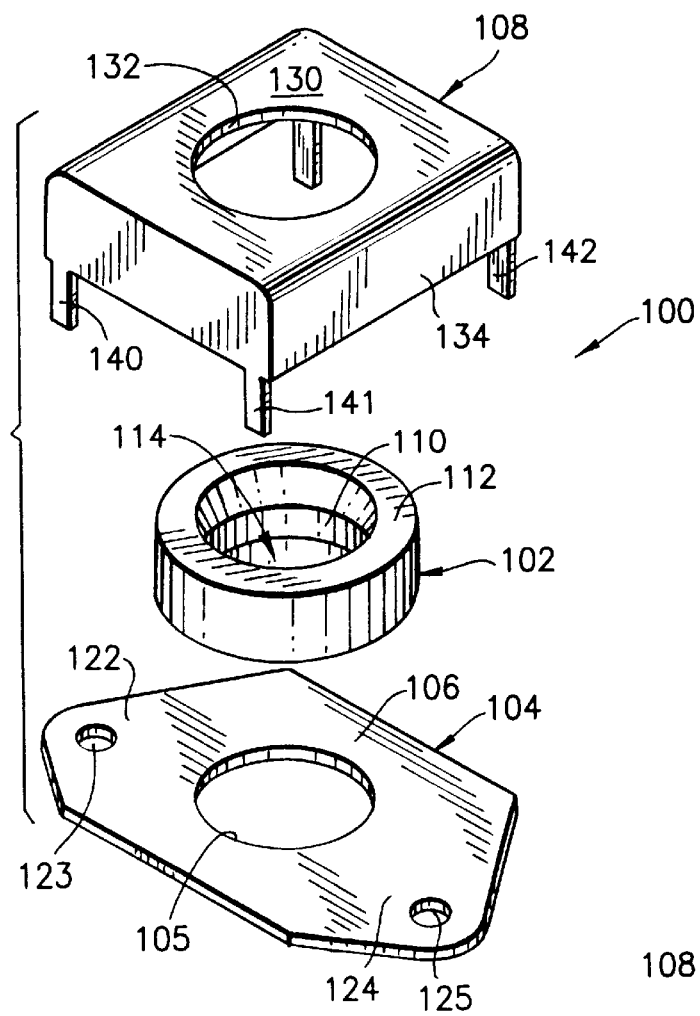
FIG. 7 is an exploded perspective view of the snap receptor and capture bracket of another snap-on mounting attachment according to the invention herein.
Figure 8:
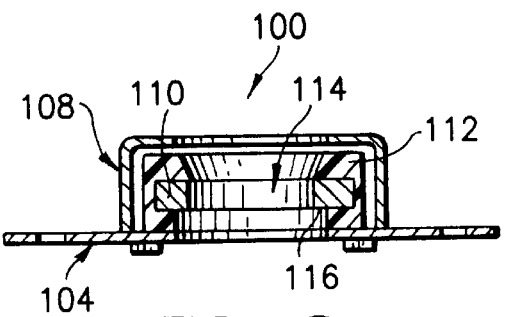
FIG. 8 is a sectional view of the capture bracket and snap receptor of FIG. 7, in assembled condition.
Figure 9:
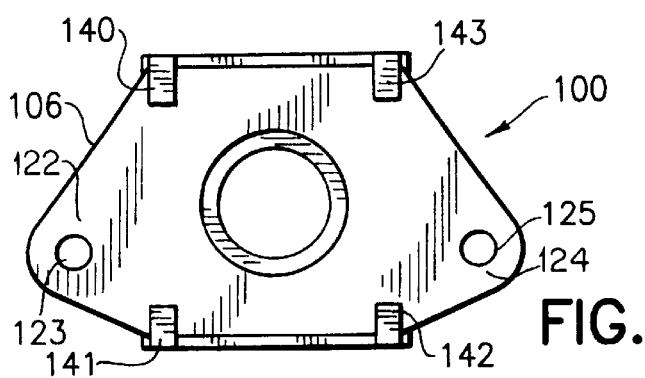
FIG. 9 is a bottom view of the capture bracket and snap receptor of FIG. 7, in assembled condition.

With reference to FIGS. 7–9, snap receptor 102 and capture bracket 104 which, together with fastener stud 20, provides another snap-on mounting attachment according to the invention herein. The capture bracket 104 has a lower plate 106 and upper plate 108. The snap receptor is similar to the snap receptor 24 described above, having a ring 110, preferably of metal, embedded in a shell 112, preferably of nylon. The shell and ring define a stud-receiving opening 114 which is preferably counterbored at the top thereof, but does not have a collar. The ring 110 defines a lip 116 for engaging the holding barbs of the fastener stud. The bottom plate 104 includes a generally rectangular center portion defining opening 106 and further incorporates mounting ears 122 and 124 having attachment holes 123 and 125, respectively. The upper plate 106 is formed as a rectangular box and includes a top panel 130 defining a central opening 132, and a rectangular peripheral sidewall 134. At the corners of the sidewall extend four tabs 140–143, which are bent over the bottom plate 106, to mount the upper plate to the bottom plate, as best seen in FIG. 9. The snap receptor 102 is retained in floating encapturement within the capture bracket, i.e., the snap receptor is permitted limited lateral and vertical movement within the sidewall, bottom plate and upper plate, capture bracket, to facilitate aligning the snap receptor and fastener studs and to accommodate tolerances between assembled parts.

The capture bracket 104, with the snap receptor 102 therein, may be mounted to the spokes of the steering wheel 12 in the same manner as the capture bracket 24 described above, and achieve snap on mounting of the airbag inflator module to the steering wheel in the same manner and with the same advantages as well.

As seen in FIG. 6, fastener stud 20 is shown in assembled condition. Stud 20 is shown in exploded view in FIG. 10. Stud 20 includes an enlarged head 30 at one end having an irregularly shaped socket, such as hex socket 130, for receiving a like configured tool therein. A knurled portion 131 extends from head 30, integral therewith, to threaded mounting post 34. Post 34 terminates in a distal end 132. Aforementioned barbs 36, 36a, 36b and 36c, (the remaining barbs opposite barbs 36, 36a, 36b and 36c are not visible in FIG. 10 and all barbs extend from and around ring portion 133 integral therewith). Ring portion 133 has an opening 234 therethrough adapted to receive shaft 34 therethrough. Ring portion 133 abuts against the underside of head 30 as seen in assembled view in FIG. 6, the barbs extending away from head 30. Sleeve 32 has an outer cylindrical main body portion 334 terminating in a reduced diameter end 135. Sleeve 32 has a throughbore 136 receivable about knurled portion 131 and retained thereon, the end 135 being disposed inside of ring portion 133 when assembled to shaft 34 as seen in FIG. 6. The final installed position is shown in FIG. 6 where sleeve 32 retains ring portion 133 in position.

Figure 10:
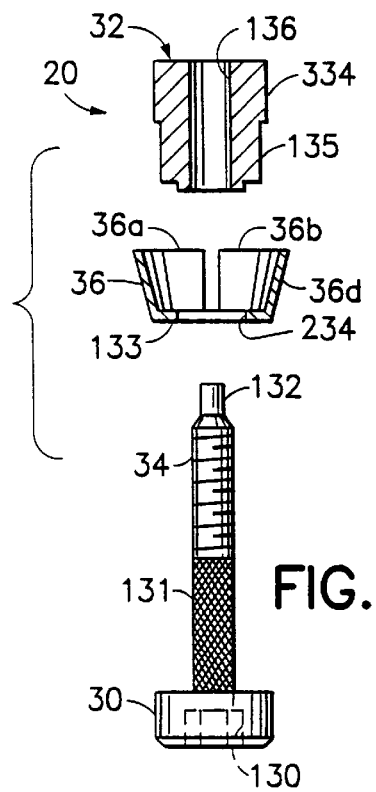
FIG. 10 is an exploded view of the stud alone of FIGS. 1 to 9.
Figure 11:
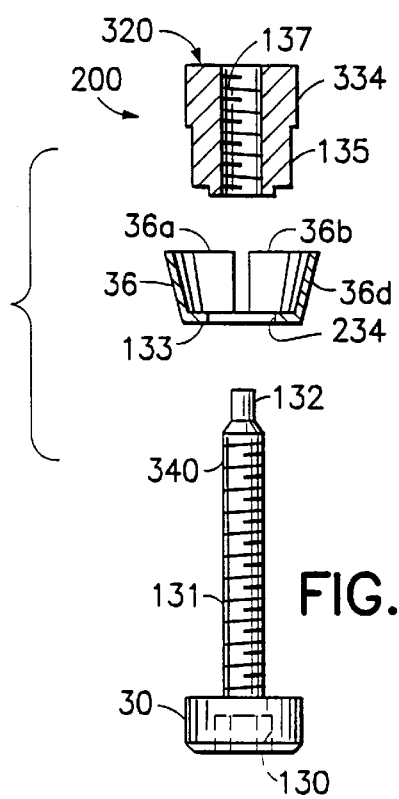
FIG. 11 is an exploded view of a modified stud in accordance with the teachings of the invention.

Although a knurled portion 131 is shown in FIG. 10, as seen in FIG. 11 wherein like numerals refer to like parts of the stud 20 of FIG. 10, stud 200 shows shaft 340 threaded in the area adjacent head 30. Ring portion 137 is assembled to stud 200 similarly to the embodiment of FIG. 10. However, sleeve 320, otherwise identical to sleeve 32 of FIG. 10, has a threaded throughbore threadably receivable on threaded shaft 340.

In both embodiments in FIGS. 10 and 11 the final assembled view is as shown in FIG. 6 wherein the terminal end, the threaded shaft 34 extends away from sleeve 32.

Figure 12:
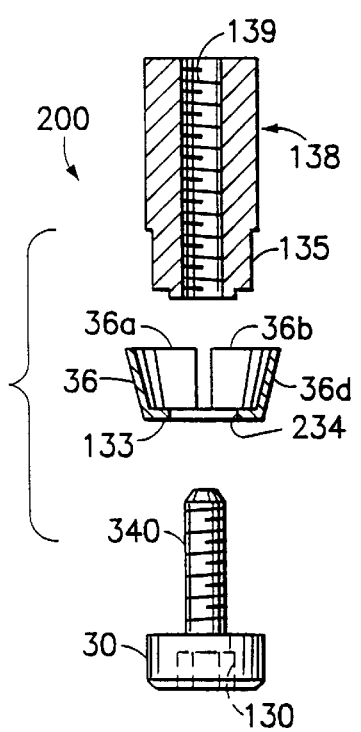
FIG. 12 is an exploded view of another modification stud in accordance with the teachings of the invention.
Figure 13:
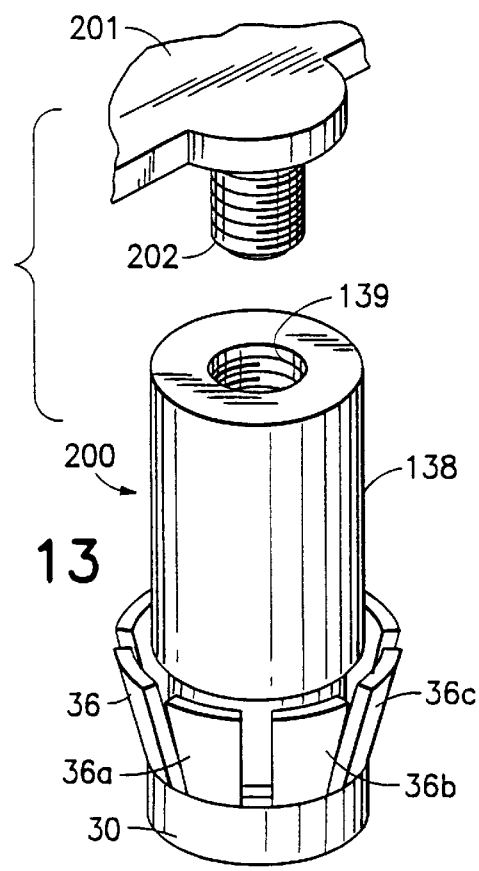
FIG. 13 is an assembled view of the stud alone of FIG. 12.

However, as seen in FIG. 12 wherein again like numerals refer to like parts of the embodiment of FIG. 11, sleeve 138 is substantially longer than sleeve 320 of FIG. 11 having a threaded throughbore 139 threadably receivable on threaded shaft 340. The final installed position is shown in FIG. 13.

Thus, for some applications, a threaded shaft 202 (FIG. 13) extending from the application 201 may be threaded into the threaded throughbore 139 of sleeve 138.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A snap-on mounting attachment for securing an airbag inflator module having a base plate to a support provided on a steering wheel of a motor vehicle, the snap-on mounting attachment comprising:
   A) a fastener stud with at least one yieldable, outwardly-biased holding barb, the fastener stud secured to and extending from one of the airbag inflator module base plate and the vehicle support; and
   B) a snap receptor mounted on the other of the airbag inflator base plate and vehicle support, the snap receptor having a limited range of lateral and vertical movement providing a floating encapturement for the snap receptor with respect to the other of the airbag inflator and vehicle support, the snap receptor comprising a ring embedded in a shell, the ring surrounding and at least partially defining a stud receiving opening extending therethrough for accommodating the fastener stud and the ring further defining a lip for engaging the at least one yieldable holding barb, the floating encapturement permitting a limited range of movement of the snap receptor for alignment of the snap receptor with the fastener stud and for accommodating tolerances in the airbag inflator module, steering wheel, and snap-on mounting attachment, whereby insertion of the fastener stud into the snap receptor opening engages the holding barb with the snap receptor to secure the airbag inflator module to the vehicle support.

2. A snap-on mounting attachment as defined in claim 1 wherein the fastener stud comprises a sleeve having a cylindrical profile and plurality of the yieldable, outwardly-biased holding barbs extending angularly outwardly therefrom and having distal tips thereon for engaging the snap receptor.

3. A snap-on mounting attachment as defined in claim 2 wherein the holding barbs yieldably retract into the profile of the sleeve as the fastener stud is inserted in the opening in the snap receptor.

4. A snap-on mounting attachment as defined in claim 1 wherein the fastener stud is threadably secured to one of the airbag inflator module base plate and vehicle support and is threadably removable to release the mounting attachment.

5. A snap-on mounting attachment as defined in claim 4 wherein the end of the fastener stud is configured for engagement by a tool to remove the stud and release the mounting.

6. A snap-on mounting attachment as defined in claim 1 wherein the stud receiving opening of the snap receptor is counterbored.

7. A snap-on mounting attachment as defined in claim 1 wherein the ring is metal and the shell is a polymer.

8. A snap-on mounting attachment as defined in claim 7 wherein the ring is steel and the shell is nylon.

9. A snap-on mounting attachment as defined in claim 1 wherein the snap receptor is received in floating encapturement in a capture bracket secured to one of the airbag inflator module and vehicle support, the capture bracket retaining the snap receptor therein and permitting said limited range of lateral and vertical movement within the capture bracket.

10. A snap-on mounting attachment as defined in claim 9 wherein the capture bracket comprises an upper retainer plate and a lower retainer plate holding the snap receptor in floating encapturement therebetween, the upper and lower retainer plates defining openings accessing the fastener stud to the stud receiving opening in the snap receptor.

11. A snap-on mounting attachment as defined in claim 10 wherein the snap receptor defines an upwardly extending collar partially defining the stud receiving opening, the collar extending through an opening in the upper retainer plate, permissible movement of the collar within the opening in the upper retainer plate providing the limited range of vertical motion of the snap receptor within the capture bracket.

12. A snap-on mounting attachment as defined in claim 11 wherein the collar is counterbored for receiving the fastener stud.

13. A snap-on mounting attachment as defined in claim 10 wherein the upper and lower retainer plates respectively comprise mounting ears and attachment holes formed through the mounting ears, whereby the attachment holes are aligned and the upper and lower retainer plates are secured together and to one of the airbag inflator module and vehicle support by fasteners extending through the aligned attachment holes.

14. A snap-on mounting attachment as defined in claim 10 wherein the upper and lower retainer plates comprise a sidewall defining an enclosure holding the snap receptor in floating encapturement.

15. A snap-on mounting attachment as defined in claim 1 and further comprising a bias stop on one of the airbag inflator module and the support on the steering wheel and bearing against the other of the airbag inflator module and the support on the steering wheel to bias the snap receptor against its mounting.

16. A snap-on mounting attachment for securing an airbag inflator module having a base plate to a support provided on a motor vehicle, the snap-on mounting attachment comprising:
   A) two fastener studs secured at spaced apart locations on and extending from a base plate of an airbag inflator module, each fastener stud having at least one yieldable holding barb extending outwardly therefrom;
   B) two capture brackets respectively mounted to a support on a motor vehicle;
   C) two snap receptors, each comprising a metal ring embedded in a polymer shell and defining a stud receiving opening therethrough including a lip for engaging the at least one holding barb of one fastener stud, the snap receptors respectively mounted in the two capture brackets and spaced-apart for receiving the two spaced-apart fastener studs, each snap receptor having a limited range of lateral and vertical movement providing a floating encapturement for the snap receptor with respect to the support on the motor vehicle; and
   D) at least two resilient bias stops mounted on one of the airbag inflator module and vehicle support and engaged therebetween for biasing the snap-on mounting attachment into rattle free condition.

17. A snap-on mounting attachment as defined in claim 16 wherein each snap receptor includes an upwardly extending collar extending into an opening defined by the capture bracket for holding the snap receptor in its respective capture bracket but permitted limited range of horizontal movement therein, and the collar is counterbored for receiving the fastener stud.

18. A driver's side passenger restraint system comprising:
A) a steering wheel having a rim, hub, and connecting spokes, and also having a cover extending over the rim and a portion of the spokes extending inwardly from the rim;
B) two capture brackets mounted at spaced apart locations on the spokes of the steering wheel;
C) two snap-in receptors, each snap-in receptor having a metal ring embedded in a polymer shell and defining a stud receiving opening including a lip defined by the metal ring, each snap-in receptor respectively held in a corresponding capture bracket having a limited range of both lateral and vertical movement providing a floating encapturement for the snap-in receptor with respect to the capture bracket, the capture brackets exposing the stud receiving openings in the snap-in receptors in the range of movement afforded by the floating encapturement;
D) an airbag inflator module including a base plate, inflator, airbag and cover, the cover shaped complementary to the cover of the steering wheel; and
E) two fastening studs extending from spaced-apart locations on the base plate of the airbag inflator module, each fastener stud including at least one yieldable holding barb for engaging the lip of a corresponding snap-in receptor and the fastener studs being spaced on the module base plate for insertion through the snap-in receptors to mount the airbag inflator module to the steering wheel with the airbag inflator module cover and steering wheel cover in their complementary positions.

* * * * *